J. WEISGARBER.
GRAIN LIFTER.
APPLICATION FILED MAY 6, 1913.
1,123,632.
Patented Jan. 5, 1915.
2 SHEETS—SHEET 1.
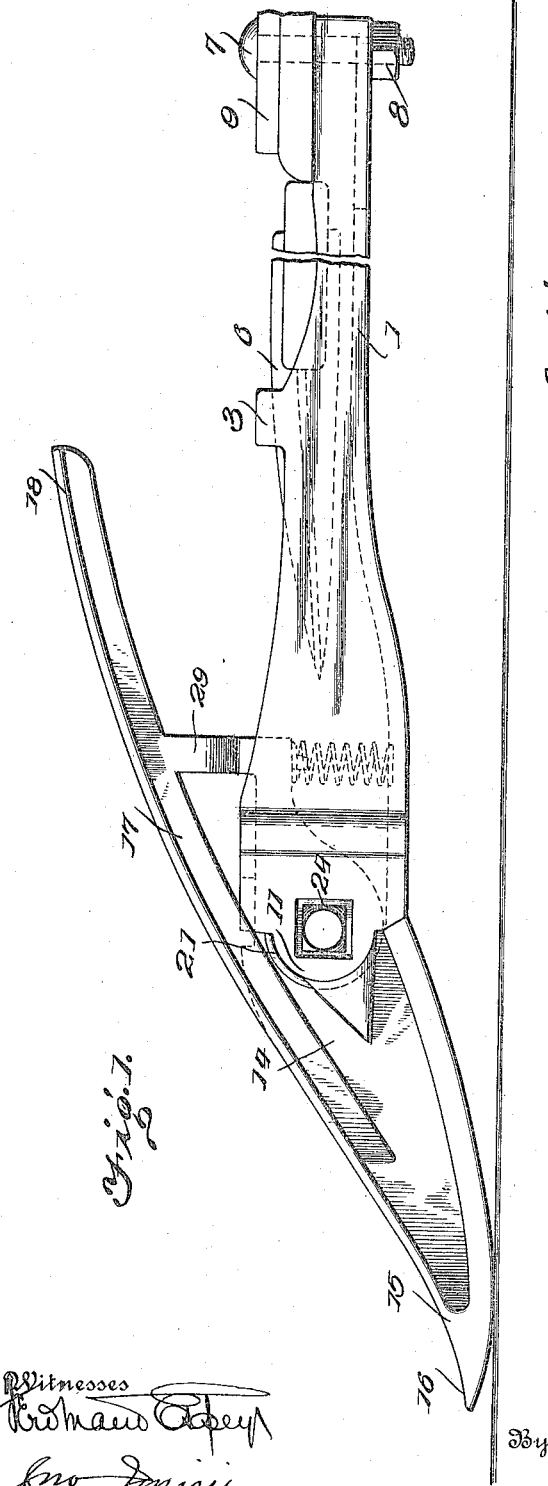
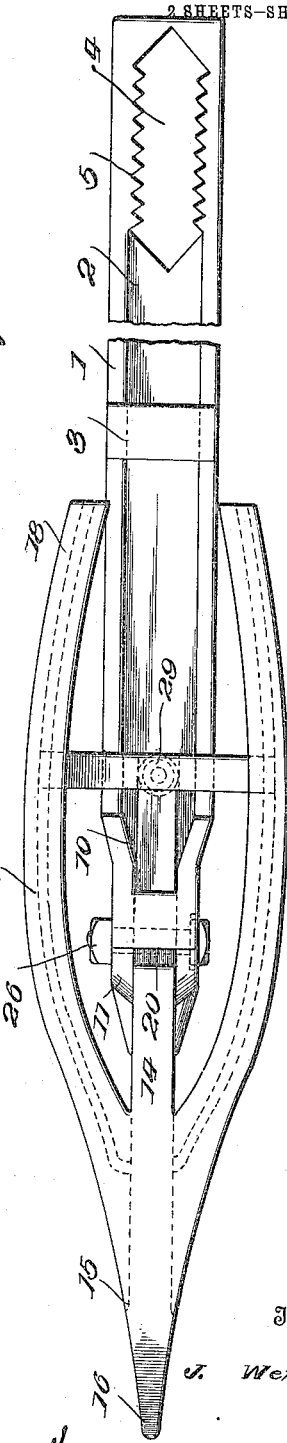
Inventor
J. Weisgarber
Attorneys

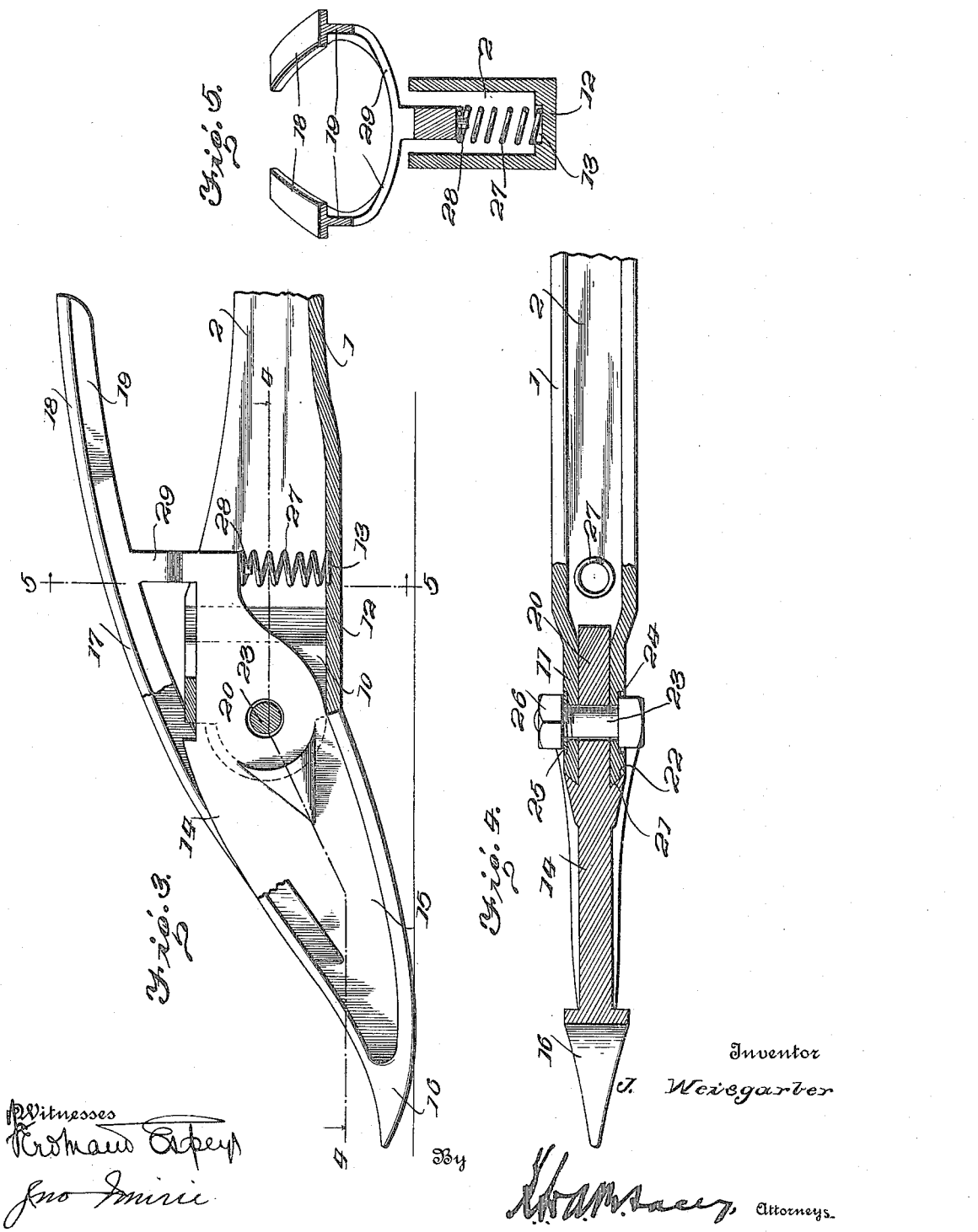

UNITED STATES PATENT OFFICE.

JOHN WEISGARBER, OF MOUNT EATON, OHIO.

GRAIN-LIFTER.

1,123,632.　　　　Specification of Letters Patent.　　Patented Jan. 5, 1915.

Application filed May 6, 1913. Serial No. 765,944.

*To all whom it may concern:*

Be it known that I, JOHN WEISGARBER, citizen of the United States, residing at Mount Eaton, in the county of Wayne and State of Ohio, have invented certain new and useful Improvements in Grain-Lifters, of which the following is a specification.

This invention relates to grain lifter attachments for mowers, binders, reapers, and in fact all harvesting machinery having sickle bars.

The ordinary form of grain lifter is constructed with a single prong or elevating finger which in the case of "fly broken" grain might serve to elevate the center of a stalk while the head of the stalk being without sufficient support remains in the path of the knives of the sickle bars. It is one aim of the present invention therefore to provide a grain lifter attachment of the class described which will positively elevate and support the stalks so that they will be properly cut and none of the heads will be lost.

Another aim of the invention is to provide a lifter attachment which may be applied to the ordinary guard-finger and sickle bar and secured in place by the bolt which secures the said finger without however in any way injuring or weakening the attachment of the finger to the sickle bar.

Another aim of the invention is to provide an attachment of the class described consisting essentially of a shank to be rigidly attached to an ordinary guard tooth and a head which is yieldably supported for rocking movement by the shank and the invention has as another object to so connect the head with the shank as to provide against loss of the head should the pivot-bolt become loosened.

A still further aim of the invention is to provide a grain lifter attachment in which the lifting head and fingers are supported in such manner that they will yield to the weight of the grain and not be liable to be broken when resistance is offered to their passage between the stalks.

In the accompanying drawings:—Figure 1 is a side elevation of the grain lifter embodying the present invention. Fig. 2 is a top plan view of the attachment. Fig. 3 is a view partly in side elevation and partly in section illustrating the manner of connecting the head of the lifter with the shank. Fig. 4 is a horizontal sectional view on the line 4—4 of Fig. 3. Fig. 5 is a vertical transverse sectional view on the line 5—5 of Fig. 3.

Corresponding and like parts are referred to in the following description and indicated in all the views of the drawings by the same reference characters.

In the drawings the shank of the grain lifter embodying the present invention is indicated in general by the numeral 1 and at its upper side and for the major portion of its length is formed with a longitudinally extending seat 2 designed to receive one of the guard teeth of a sickle bar, in a manner to be presently explained. Forwardly of its portion in which the seat 2 is formed, the shank is enlarged and its enlarged portion is formed with a socket 3 designed to receive the point of the said guard tooth. The rear portion of the shank 1 is formed with a longitudinally extending slot 4 the walls of which are notched as at 5. The guard tooth to which the lifter is attached, is indicated at 6 and is of the ordinary form and attached by the ordinary bolt 7 and nut 8 to the sickle bar 9. The tooth 6 has its pointed forward end inserted in the socket 3 and the body of the tooth lies in the seat 2.

In assembling the lifter with the guard tooth, the bolt 7 is removed and after the shank of the lifter has been fitted to the tooth the bolt is inserted through the slot 4, through the shank of the guard tooth, and through the sickle bar. It will be apparent that by notching the walls of the slot 4, the bolt may have the corners of its squared portion engaged in opposite ones of the notches so as to securely hold the shank of the lifter against forward displacement with respect to the said guard tooth. For a purpose which will be presently made clear the enlarged portion of the shank of the lifter is bifurcated and recessed at 10 to form spaced ears 11, the bifurcation being closed at the under side of the shank for a short distance, as indicated at 12 and the said portion 12 being formed with a seat 13.

The head of the lifter is indicated at 14 and is preferably narrowed in a forward direction as indicated at 15 and at its forward end is shaped to form a pointed nose 16 designed of course to enter between the stalks to be lifted. Integral with or secured to the opposite sides of the notch 16 near its top are the forward ends of the lifting fingers 17. The fingers 17 are here shown as two in number, although a greater number may be employed with advantage and as clearly shown in Figs. 1 and 2 of the drawings they are curved upwardly and rearwardly from their forward to their rear ends and from their said forward ends to a point adjacent their rear ends diverge rearwardly. Beyond the point mentioned they slightly converge and their said converging portions are curved to a less degree than are their other portions and are indicated by the numeral 18. It will be obvious that the fingers may be of any cross-sectional contour although for a purpose which will be presently made apparent they are preferably of the cross-sectional contour shown in Fig. 5 of the drawings. In this figure the fingers are illustrated as substantially flat on their upper sides and also on their under sides except at a point midway between their edges where they are formed with longitudinally extending ribs 19.

The head 14 of the lifter is recessed in its opposite sides to form a pivot ear 20 and the walls of the recesses are preferably beveled as clearly shown in Fig. 4 of the drawings and as indicated at 21. The ear 20 is fitted between the ears 11 and the said ears 11 have their edges beveled as indicated at 22 so as to fit the bevel of the walls 21 and thereby brace the ears 11 against being sprung or forced away from the said ear 20. The ears 11 and 20 are formed with openings through which a pivot-bolt 23 is passed, one of the ears 11 being countersunk as at 24 to receive the head of the said bolt 23 and the other ear being countersunk to receive a washer 25 against which the nut 26, threaded upon the bolt, is designed to bear.

It will be obvious that when the parts are assembled in the manner shown in the several figures of the drawings, the head 14 will be supported for pivotal or rocking movement at the forward end of the shank 1 and in order that the nose 16 may ride over inequalities in the ground surface and in order that the fingers 17 may be relieved to a certain extent of the weight of the grain lifted by the device, a cushioning means is provided between the said head and the shank. The means mentioned is in the nature of a coil spring 27 which at its lower end is disposed in the seat 13 and at its upper end fits over a stud 28 formed upon the under side of the ear 20 at the rear end thereof. The spring 27, having a tendency to expand, normally holds the nose 16 in lowered position and the rear ends of the fingers in elevated position but it will be apparent that should the nose strike a rise in the ground surface or should weight be imposed upon the fingers 17, the head 14 would rock upon the bolt 23 and such movement would be yieldably resisted by the spring. In order that the fingers 17 may be afforded firm support the ear 20 at its rear end is formed with supporting arms 29 which extend upwardly and laterally in opposite directions and at their upper ends are integral with or secured to the ribs 19 of the respective fingers 17. It will be observed from inspection of Fig. 3 of the drawings that the arms 29 receive the thrust or weight imposed upon the fingers 17 at a point directly above the spring 27 so that shocks and weight are transmitted directly to the spring.

From the foregoing description of the invention it will be apparent that as the lifter rides over the ground surface its nose will enter between the stalks of the grain and the fallen stalks will be lifted by the lifting fingers 17 and separated so as to be positioned directly in the path of the knives of the sickle bar.

It will further be understood as before stated, that the nose may ride over inequalities of the ground surface without lifting the sickle bar or without receiving impacts such as would tend to injure it or its connection with the sickle bar and that grain lifted by the fingers will be supported at their rear ends in position to be cut by the knives of the sickle bar and that the weight of the grain will be cushioned by the spring 27.

Having thus described the invention what is claimed as new is:—

In a grain lifter, a shank having a recessed forward portion forming spaced ears having beveled edges, a head having an ear fitted between the ears of the shank, the said head having beveled shoulders at opposite sides of the ear for coöperation with the beveled edges of the ears of the pivot-bolt passed through the said ears and pivotally connecting the head with the shank, a spring arranged within the recess of the shank and between the bottom wall of the recess and the ear upon the head and serving to yieldably resist rocking movement of the head in one direction, the head having a forwardly extending nose, and a lifting finger extending from the nose.

In testimony whereof I affix my signature in presence of two witnesses.

JOHN WEISGARBER. [L. S.]

Witnesses:
DALE E. MILLER,
A. B. STAIR.

Copies of this patent may be obtained for five cents each, by addressing the "Commissioner of Patents, Washington, D. C."